US008303403B2

(12) United States Patent

Anderson et al.

(10) Patent No.: US 8,303,403 B2

(45) Date of Patent: Nov. 6, 2012

(54) MULTI-GAME CONTEXT FOR EPISODIC GAMING

(75) Inventors: Peter R. Anderson, Glenview, IL (US); Michael R. Bytnar, Naperville, IL (US); Kevin Kahley, Chicago, IL (US)

(73) Assignee: WMS Gaming Inc., Waujegan, IL (US)

( * ) Notice: Subject to any disclaimer, the term of this patent is extended or adjusted under 35 U.S.C. 154(b) by 764 days.

(21) Appl. No.: 12/300,431

(22) PCT Filed: May 8, 2007

(86) PCT No.: PCT/US2007/011040

§ 371 (c)(1), (2), (4) Date: Nov. 11, 2008

(87) PCT Pub. No.: WO2008/108780

PCT Pub. Date: Sep. 12, 2008

(65) Prior Publication Data

US 2009/0156299 A1 Jun. 18, 2009

Related U.S. Application Data

(60) Provisional application No. 60/747,070, filed on May 11, 2006.

(51) Int. Cl.
*A63F 13/10* (2006.01)

(52) U.S. Cl. .................... 463/29; 463/9; 463/16; 463/25

(58) Field of Classification Search .................... 463/16, 463/17, 25, 29, 42, 9, 20
See application file for complete search history.

(56) References Cited

U.S. PATENT DOCUMENTS 6,104,815 A 8/2000 Alcorn et al.
6,264,561 B1 * 7/2001 Saffari et al. .................... 463/42
6,267,669 B1 * 7/2001 Luciano et al. .................... 463/7
7,611,409 B2 * 11/2009 Muir et al. .................... 463/29
2002/0090987 A1 * 7/2002 Walker et al. .................... 463/16
2004/0132530 A1 7/2004 Rutanen et al.
2004/0192434 A1 * 9/2004 Walker et al. .................... 463/25
2005/0159204 A1 7/2005 Moshal
2006/0040725 A1 2/2006 Walker et al.
2006/0217195 A1 9/2006 Walker et al.

FOREIGN PATENT DOCUMENTS

WO WO 2004111954 A1 * 12/2004

OTHER PUBLICATIONS

"International Application Serial No. PCT/US2007/011040, International Search Report and Written Opinion mailed Sep. 22, 2008", 14 pgs.

* cited by examiner

*Primary Examiner* — Peter DungBa Vo
*Assistant Examiner* — Damon Pierce
(74) *Attorney, Agent, or Firm* — Schwegman Lundberg & Woessner, P.A.

(57) ABSTRACT

This document discusses, among other things, systems and methods for managing multi-game contexts. An apparatus comprises a wagering game unit operable to present a wagering game upon which monetary value can be wagered; and a game context management unit operable to determine a list of installed wagering games on a wagering game machine and to determine one or more relevant rules, wherein a relevant rule is a one that is related to at least one of the installed wagering games, the game context management unit further operable to process each relevant rule to calculate a group of available games; and to present the available games on a primary display.

21 Claims, 7 Drawing Sheets

500

| ACCOUNT BALANCE | GAMES |
|---|---|
| -$50 - $500 | A |
| $501 - $1,000 | A,B |
| $1,001 - $5,000 | A,B,C |
| $5001 - $20,000 | B,C,D |
| $20,001 - $100,000 | C,D,E |
| $100,000 + | A,B,C,D,E |

502 504

600

| PLAYER STATUS | GAMES |
|---|---|
| BRONZE | A |
| SILVER | A,B |
| GOLD | A,B,C |

602 604

400

| | GAME | START-DATE (402) | END-DATE (404) |
|---|---|---|---|
| 406 | GAME A | 3/10/2006 | 12/15/2006 |
| 408 | GAME B | 11/15/2006 | 1/1/2099 |
| 410 | GAME C | 1/1/1900 | 1/1/2099 |
| 412 | GAME D | 7/4/2006 | 7/5/2006 |

414, 420, 418, 416

500

| ACCOUNT BALANCE | GAMES |
|---|---|
| -$50 - $500 | A |
| $501 - $1,000 | A,B |
| $1,001 - $5,000 | A,B,C |
| $5001 - $20,000 | B,C,D |
| $20,001 - $100,000 | C,D,E |
| $100,000 + | A,B,C,D,E |

502, 504

600

602 (rows) — 604 (games)

| PLAYER STATUS | GAMES |
|---|---|
| BRONZE | A |
| SILVER | A,B |
| GOLD | A,B,C |

MULTI-GAME CONTEXT FOR EPISODIC GAMING

RELATED APPLICATION

This patent application is a U.S. National Stage Filing under 35 U.S.C. 371 from International Patent Application Serial No. PCT/US2007/011040, filed May 8, 2007, and published on Sep. 12, 2008, as WO 2008/108780 A2, which claims the priority benefit of U.S. Provisional Patent Application Ser. No. 60/747,070 filed May 11, 2006 and entitled "MULTI-GAME CONTEXT FOR EPISODIC GAMING", the contents of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007, WMS Gaming, Inc.

FIELD

Embodiments of the inventive subject matter relate generally to wagering game machines, and more particularly, to managing a wagering game machine.

BACKGROUND

Wager gaming machines, such as slot machines, video poker machines, and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are most likely attracted to the most entertaining and exciting of the machines. Consequently, shrewd operators strive to employ the most entertaining and exciting machines available because such machines attract frequent play and increase profitability for the operator. In the competitive wager gaming machine industry, there is a continuing need for manufacturers to produce new game types or to enhance entertainment and excitement associated with existing wager gaming machines.

Computerized wagering games have largely replaced traditional mechanical wagering game machines such as slot machines, and are rapidly being adopted to implement computerized versions of games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management.

DETAILED DESCRIPTION

Example Operating Environment

Figure 1:
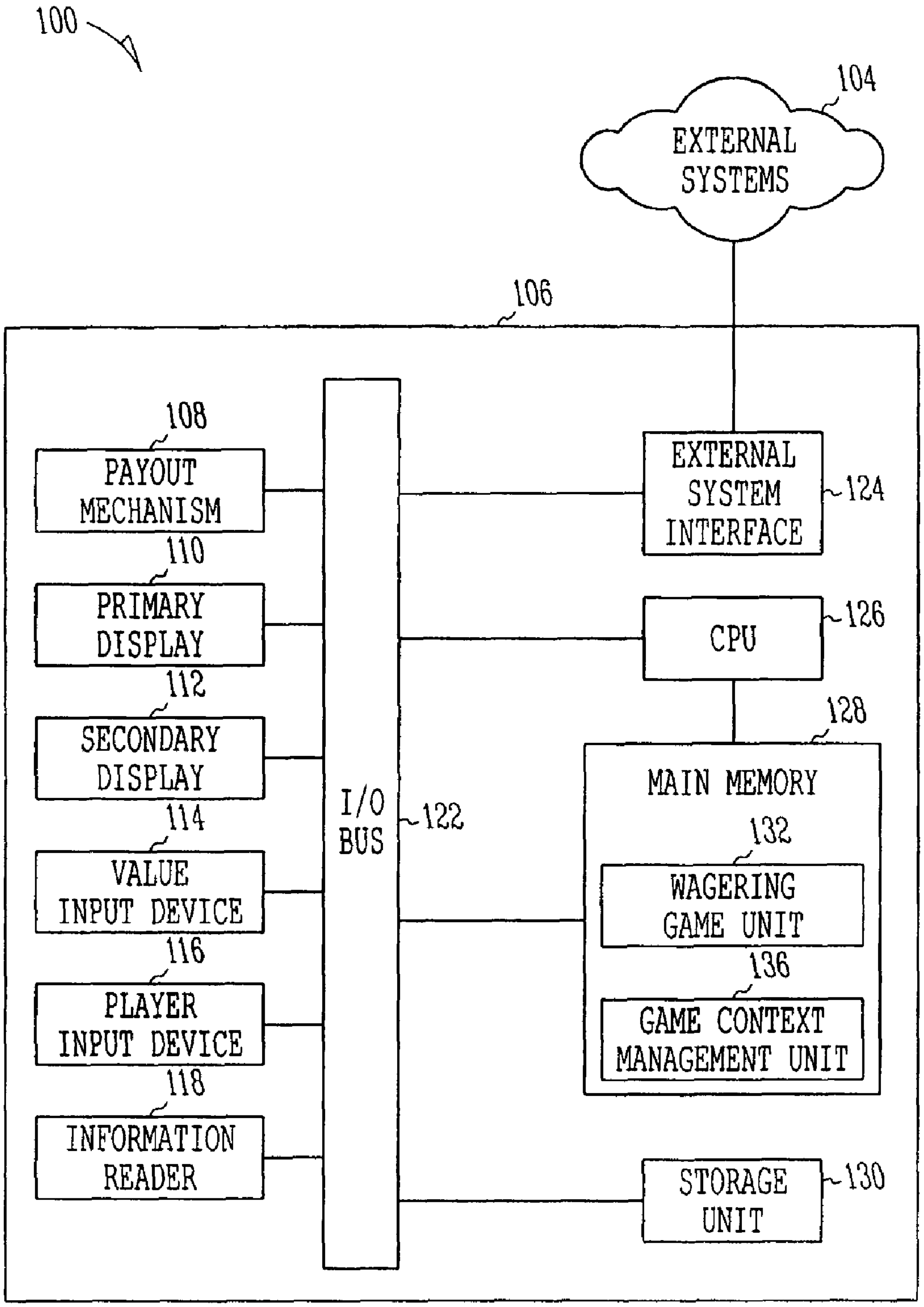
FIG. 1 is a block diagram illustrating a control system suitable for operating a wagering game machine, according to example embodiments of the invention.

FIG. 1 is a block diagram illustrating an architecture including a control system 106 suitable for operating a wagering game machine, according to example embodiments of the invention. As shown in FIG. 1, the control system 106 includes a central processing unit (CPU) 126 connected to main memory 128, which includes a wagering game unit 132 and a game context management unit 136. In one embodiment, the wagering game unit 132 can present wagering games upon which monetary value can be wagered, such as video poker, video blackjack, video slots, video lottery, etc. In one embodiment, the game context management unit 136 controls the presentation of one or more games on the control system 106, as described herein.

The CPU 126 is also connected to an input/output (I/O) bus 122, which facilitates communication between the wagering game machine's components. The I/O bus 122 is connected to a payout mechanism 108, primary display 110, secondary display 112, value input device 114, player input device 116, information reader 118, and storage unit 130. The I/O bus 122 is also connected to an external system interface 124, which is connected to external systems 104 (e.g., wagering game networks).

In one embodiment, the control system 106 can include additional peripheral devices and/or more than one of each component shown in FIG. 1. For example, in various embodiments, the control system 106 can include one or more external system interfaces 124 and one or more CPUs 126. In one embodiment, any of the components can be integrated or subdivided. Additionally, in one embodiment, the components of the control system 106 can be interconnected according to any suitable interconnection architecture (e.g., directly connected, hypercube, etc.).

In one embodiment, any of the components of the control system 106 (e.g., the game context management unit 136) can include hardware, firmware, and/or software for performing the operations described herein. Furthermore, any of the components can include machine-readable media including instructions for causing a machine to perform the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Figure 2:
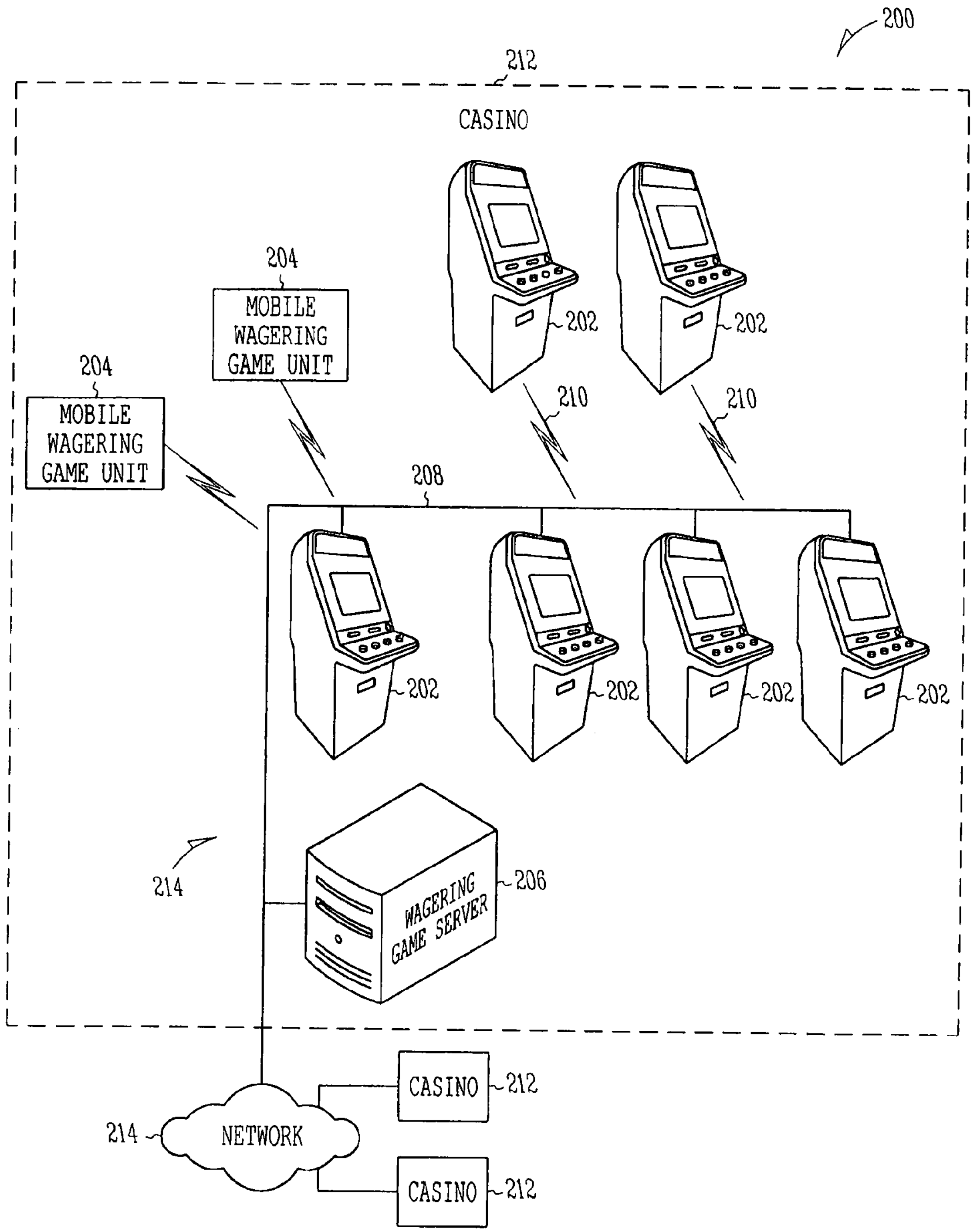
FIG. 2 is a schematic diagram illustrating a wagering game network, according to example embodiments of the invention.

FIG. 2 is a schematic diagram illustrating a wagering game network 200, according to example embodiments of the invention. The wagering game network 200 includes a plurality of casinos 212 connected to a communications network 214. Each of the plurality of casinos 212 includes a local area network 214, which includes wagering game machines 202 and mobile wagering game machines 204 connected to a wagering game server 206. The wagering game machine 202, mobile wagering game machine 204, and wagering game server 206 can include hardware and machine-readable media including instructions for managing a wagering game context, as described herein. In one embodiment, the wagering game server 206 can perform game context management in concert with serving wagering games over the local area network.

The wagering game machines described herein can take any suitable form, such as floor standing models, handheld mobile units, bartop models, workstation-type console models, etc. In one embodiment, the wagering game network 200 can include other network devices, such as accounting servers, wide area progressive servers, and/or other devices suitable for use in connection with embodiments of the invention.

The components of each casino 212 can communicate over wired 208 and/or wireless connections 210. Furthermore, they can employ any suitable connection technology, such as Bluetooth, 802.11, Ethernet, public switched telephone networks, SONET, etc.

Example Operations

In some computerized wagering games, a single console or cabinet is capable of providing more than one game. When multiple games exist on a wagering game console, effective management is needed to attract and excite players.

In some embodiments, wagering game machines 202 and mobile wagering game machines 204 are capable of hosting two or more games. The games may be distinct from each other, such as blackjack, slots, and poker on a single wagering game machine 202, 204 or the games may be logically related, such as an episodic multi-game theme. In such an episodic multi-game theme, the wagering game machine 202, 204 can present a game theme that is configured and assembled into several game-play units (i.e., episodes, chapters, stages, levels, etc.). The game-play units can be arranged using various relationships. For example, the game-play units can be arranged in a linear temporal relationship or progressive levels of difficulty. In an embodiment, a player is presented with an episodic game where each episode can include various challenges and rewards. If the player is successful in overcoming the challenges of an episode, then the wagering game machine 202, 204 can present the player with a follow-on episode. In some embodiments, the follow-on episode is related to the previous episode such that a common theme or storyline is established throughout. The episodic nature of the game may capture a player's interest and compel him to complete the full storyline.

In some embodiments, a non-linear episodic game is provided on the wagering game machine 202, 204. Similar to a linear episodic game, a non-linear episodic game is composed of multiple game-play units (i.e., episodes, chapters, stages, scenes, scenarios). However, in a non-linear episodic game, after a player completes a game-play unit, he may be given a choice of which game-play unit to play next. For example, during game play, a player can be presented with a decision screen. The decision screen can contain video, audio, and text that provide the player with context and clues.

Figures 3, 4, 5:
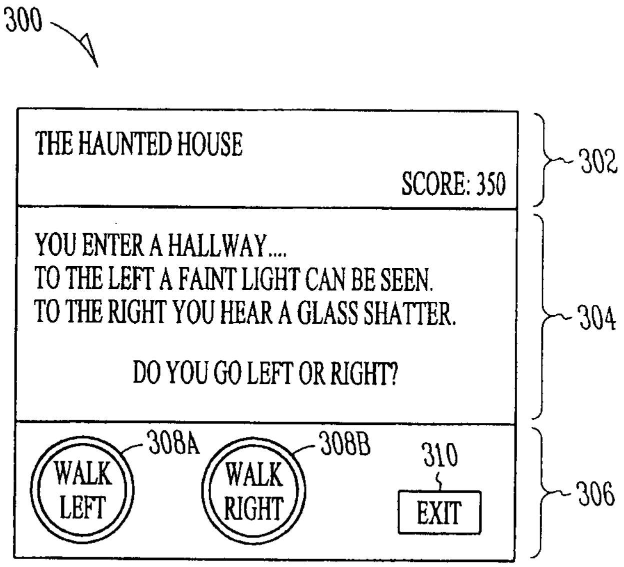
FIG. 3 is a schematic diagram illustrating a decision screen, according to example embodiments of the invention.
FIG. 4 is a chart illustrating several context rules related to dates, according to example embodiments of the invention.
FIG. 5 is a chart illustrating a set of context rules based on an aspect of a player's persistent state, according to example embodiments of the invention.

An example of a decision screen 300 is illustrated in FIG. 3. The decision screen 300 is composed of a title area 302, an information area 304, and a control area 306. The title area 302 can contain information such as the title of the game theme, a current level of play, an account balance, a score, or other general information presented to the player for reference. The information area 304 can contain graphics and text that provide information to the player to establish a context and environment of the game play. In some embodiments, the text may be overlaid on a photographic or rendered background of a hallway to further immerse the player in the game play. In some embodiments, the player is guided through a virtual world (e.g., a three-dimensional environment) and the decision screen is overlaid on the display of the virtual world at particular points in the game. In other embodiments, the background image used on the decision screen is a static display that may include animated elements. The control area 306 can contain iconic, graphical, pictorial, textual, or other types of controls that control game play. In this example, two controls 308A, 308B are provided to direct game play to the next stage in accordance with the decision presented in the information area 304. Additionally, a control 310 is provided to exit the game. In some embodiments, when exiting the game, a game state is saved. In some embodiments, the save game operation can be automatic upon exiting, triggered by an event in the game (e.g., a random event that causes advancement of a storyline), triggered by a time-based event (e.g., auto-save every 30 seconds), or triggered by a player's action. The saved game state can be used by the player, alone or in combination with other persistent state data, to continue the game at a later time. In this example, if the player does not exit the game, then depending on which direction is chosen (i.e., left or right) the player is presented with a new game-play unit with a game environment (e.g., sounds, graphics, animation, text) that continues the storyline. The player is then able to conduct a wagering game in the environment. The outcome of the wagering game can affect the next decision presented to the player, thus continuing the storyline.

In various embodiments, a non-linear episodic game can have one or more themes, including mystery, adventure, historical, fantasy, puzzle or science fiction. In other embodiments, an episodic game is based on a television show, movie, popular character, comic book character or theme, cartoon, or other popular theme. In some embodiments, linear and non-linear episodic games are presented together and may be presented in an overarching theme.

When multiple games are present on a wagering game machine 202, 204, a wagering game context is determined by a set of context rules. The context rules may vary in complexity from the simple (e.g., all games are available to play) to the complex (e.g., only some players are allowed to play some games). The context rules may govern such things as which games are available and the transitions between any available games. Further, the rules may govern when games become available or cease being available on a wagering game machine 202, 204. The configuration of such wagering game contexts as described by context rules is discussed in more detail below.

In an embodiment, a context rule is related to one or more dates. For example, one or more games may only be available for play during a certain date range or after a certain date. In another example, a game may only be available during a holiday season or during a special promotional period. In another example, a game is only available after its public release date. In another example, in an episodic game theme where Game A precedes Game B, such as by chronology or by game difficulty, Game A may only be available for a certain period after Game B's release date.

FIG. 4 is a chart illustrating several context rules 400 related to dates. Each game 406-412 has an associated start date 402 and end date 404. The start date may represent a release date of a game. In this example, Game B 408 is set to be released and available for game play on Nov. 15, 2006. Game A 406 and Game B 408 may be logically related, such as within an episodic game theme. In some situations, an earlier episode may expire after a newer episode is available. Here, supposing that Game A 406 and Game B 408 are logically related in an episodic game theme, Game A's expiration date 414 may be linked to Game B's release date 416, such as by one month apart. Other context rules are illustrated in FIG. 4 including an "always available" game. For example, Game C 410 has a start date 418 and an end date 420 that effectively ensures its availability for the lifetime of the wagering game machine 202, 204. Game proprietors may wish to only provide a special version of a game or a specific game during a particular period of time. The context rule for Game D 412 illustrates an example of a context rule related to a special occasion, in this case, the $4^{th}$ of July.

In another embodiment, a context rule is related to one or more time periods. In an embodiment, the time period is measured from a triggering event. Triggering events may include a game console installation date, a game release date, or a game expiration date. In another embodiment, the time period is a recurring period. For example, a game may be available for eight hours a day or only on the weekends.

In another embodiment, a context rule is related to an existing persistent state of a player. For example, in an episodic multi-game theme, a wagering game can identify a player's current advancement and adaptively provide appropriate episodes in the game theme. In another embodiment, a player can save one or more game states of one or more games. When beginning play at a wagering game machine, the player may be presented with the games or game states. Other characteristics of a player's persistent state may be used to determine the availability of games.

For example, a player with a higher account balance may be provided access to particular games with higher stakes. FIG. 5 is a chart illustrating a set of context rules 500 based on an aspect of a player's persistent state, in this case his account balance. Using monetary ranges 502, five context rules are defined to provide one or more games 504 depending on the detected account balance.

In another example, a player who has exhibited a tendency to play poker-type games may be provided a proportionately greater number of poker-type games to choose from in comparison to other types of games.

Figures 6, 7:
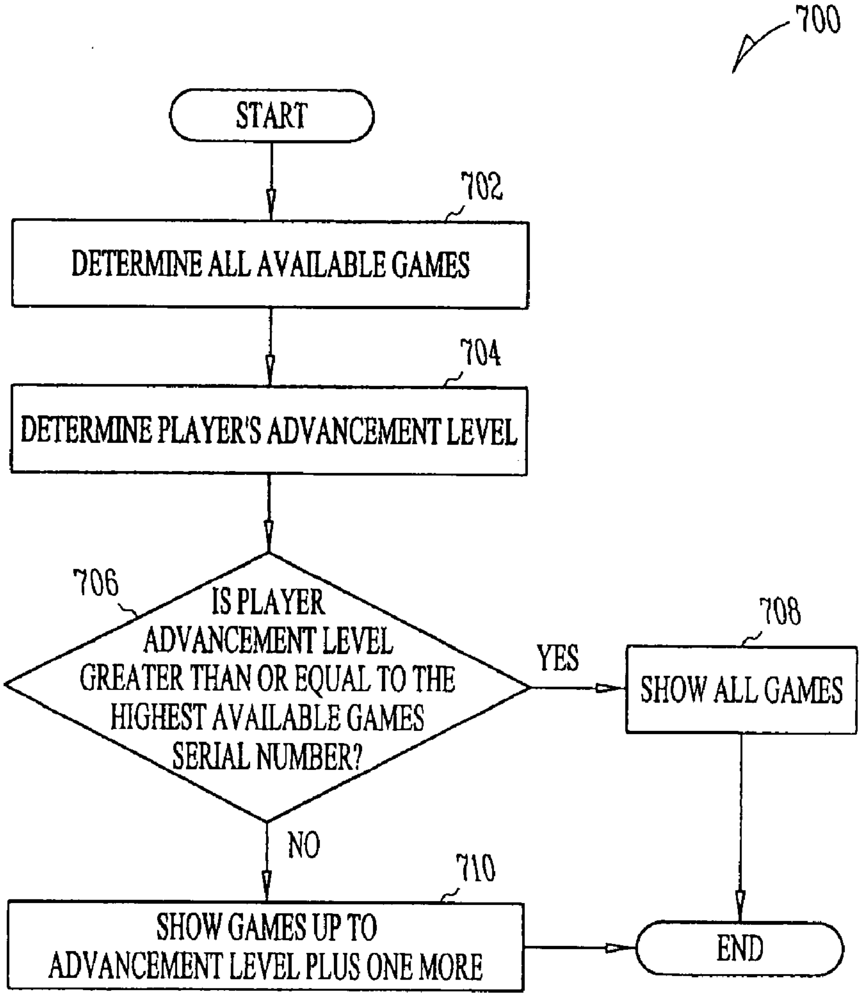
FIG. 6 is a chart illustrating a set of context rules based on another aspect of a player's persistent state, according to example embodiments of the invention.
FIG. 7 is a flowchart illustrating a method for determining available games based on a player's advancement through a linear episodic theme, according to example embodiments of the invention.

In another example, a player may have a status, such a "Bronze," "Silver," or "Gold" member status. Depending on such a status, more or fewer games may be presented to the player at the wagering game machine 202, 204. FIG. 6 is a chart illustrating a set of context rules 600 based on another aspect of a player's persistent state, in this case his player status. Here, the context rules are defined to map a player status 602 to a related set of available games 604.

In other embodiments, other aspects of a player's persistent state, such as the length of membership, the number of games won or lost, the number of games played, or amount wagered, are used to determine a player's wagering game context.

In another embodiment, a context rule is related to the transition used by a player to move from one game to the next. For example, a game may only become available after one or more games in the episodic theme have been completed. Such a configuration may be used in conjunction with systems and methods that are capable of managing a player's persistent state. A player may complete a game on a first wagering game machine 202, 204 and save his state so that when he resumes play at a second wagering game machine 202, 204, more or fewer games are available due to the outcome of the previous game. In other examples, context rules that govern transitions may restrict an episodic game to a linear progression. In another example, context rules may allow a player to jump to any available game. In yet another example, context rules provide transitions to present a non-linear episodic game theme.

FIG. 7 is a flowchart illustrating a method 700 for determining available games based on a player's advancement through a linear episodic theme. At 702, the method 700 determines all of the available games on a wagering game machine 202, 204. The availability of the games may depend on one or more context rules, such as those described herein.

At 704, a player's current advancement level is determined. For example, a wagering game machine 202, 204 may host a multi-game episodic game theme with ten stages or episodes. Each episode can have a serial number to indicate its position in the overall theme. A player may have completed four of the episodes in series. The player's current advancement level related to this episodic game theme is thus determined to be four.

At 706, the player's current advancement level is compared to the serial numbers of the available episodes (games) on the wagering game machine 202, 204. If the player's advancement level is equal to or greater than the maximum serial number available, then at 708 every episode (game) is displayed to the player for selection. In this case, the player has completed every episode available on the wagering game machine 202, 204 and is given the opportunity to replay any previously completed episode. Alternatively, if the player's current advancement level does not exceed the highest game serial number available on the wagering game machine 202, 204, then the player is presented with every episode that he has completed plus the next episode in the series for selection (see block 710). In an embodiment, when the next sequential episode is not available to present to the player, for instance when the game has not been installed or activated on the particular wagering game machine, then the player may be presented with a game higher in the sequence to play. In an embodiment, the player may be presented with every game available on the wagering game machine 202, 204, but games for which the player has not advanced far enough to play may be disabled or unable for the player to select. Presenting the full list of available games may encourage the player to increase play and advance farther.

Figure 8:
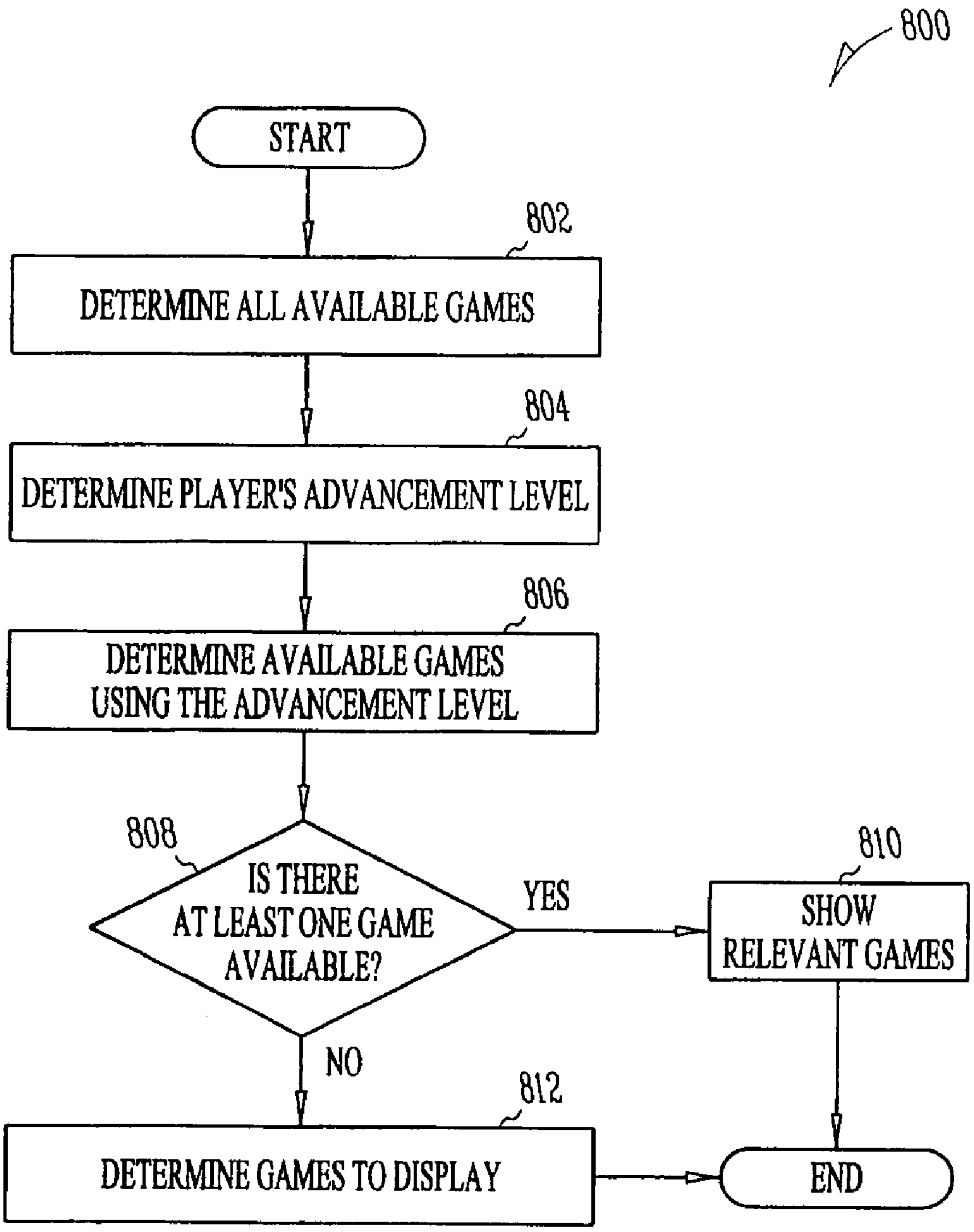
FIG. 8 is a flowchart illustrating a method for determining available games based on a player's advancement through a non-linear episodic theme, according to example embodiments of the invention.

FIG. 8 is a flowchart illustrating a method 800 for determining available games based on a player's advancement through a non-linear episodic theme. At 802, the method 800 determines all of the available games on a wagering game machine 202, 204. The availability of the games may depend on one or more context rules, such as those described herein.

At 804, a player's current advancement level is determined. In a non-linear episodic game theme, in some embodiments, a player's advancement level is determined by games, stages, or levels completed. In other embodiments, the player's advancement may be determined based on games that the player has attempted to complete or games that were presented to the player, but which the player decided not to play. In other embodiments, the player's advancement is partially or fully determined by a score, accumulated account balance, or other in-game currency or awards.

At 806, using the player's advancement level, the method 800 determines which of the games currently available on the wagering game machine 202, 204, if any, are available for play.

At 808, if it is determined that there is at least one game available, then at 810, the player is presented with games consistent with his advancement level. However, if no games are available based on the player's advancement or because the related games are not available on the wagering game machine 202, 204, then at 812, the method 800 determines at least one game to present to the player for play. In one embodiment, the method 800 randomly selects a determined number of games from the set of all available games on the wagering game machine 202, 204 to present to the player. In another embodiment, the method 800 displays the first episode of the non-linear episodic theme. In other embodiments, the method 800 may display all of the available games on the wagering game machine 202, 204.

In another embodiment, a context rule presents one game at a time on the wagering game machine 202, 204. Such a context rule may be combined with other types of context rules. For example, a first game may be made available for twelve hours a day and a second game may be made available for the other twelve hours in an alternating fashion. Casino operators may prefer to provide a single-game wagering game machine using such a context rule to remain flexible to possible multi-game use in the future and to simplify support of such wagering game machines.

In an embodiment, a wagering game context is a collection of one or more context rules. In an embodiment, the context rules which define the wagering game context are contained in one or more configuration files. For example, there may be a configuration file for each rule type. In another example, there may be a configuration file for each game on a wagering game machine 202, 204.

In an embodiment, the wagering game context is defined by one or more configuration settings stored in memory, such as in a wagering game machine's 202, 204 main memory 128 or in an external memory unit (e.g., a database).

In an embodiment, an administrative user can access a user interface to configure the wagering game context for one or more machines. For example, an administrative user may access an administrative user interface on the wagering game machine 202, 204 to configure the wagering game context for the wagering game machine 202, 204. Alternatively, the administrative user may access a user interface on a wagering game server 206 and add or modify the wagering game context for one or more wagering game machines 202, 204 connected to the wagering game server 206. In some embodiments, such a centralized configuration mechanism may comprise writing configuration files to one or more connected wagering game machines 202, 204. The wagering game machine 202, 204 may then automatically detect and use the new configuration files or alternatively, the wagering game server 206 may instruct the wagering game machine 202, 204 to reconfigure their wagering game context using the new configuration files. In other embodiments, the centralized configuration mechanism may employ a shared database from which the one or more connected wagering game machines 202, 204 may read configuration settings and apply them to generate a new wagering game context.

In some embodiments, configuration files are packaged with game files to create a configuration package. When a new game is installed on a wagering game machine 202, 204, the wagering game context is modified using the packaged configuration files in the configuration package. In other embodiments, a configuration package comprises one or more configuration files and is available independent from a wagering game and can be implemented to control games that exist on a wagering game machine 202, 204. Configuration packages may be downloaded to a wagering game machine 202, 204 from a wagering game server 206 or alternatively, they may be installed from a storage medium such as a floppy disc, CD-ROM, or flash drive.

In an embodiment, a default wagering game context is available and is used when no other wagering game context configuration has been supplied. For example, a default wagering game context may be a configuration where all games installed on a wagering game machine are available to play. Alternatively, a subset of the installed games may be designated as default games and be presented to all players regardless of their status or other persistent state characteristics.

In other embodiments, the wagering game context is defined in part by one or more configuration files and in part by one or more configuration settings read from a source other than the configuration files.

Figure 9:
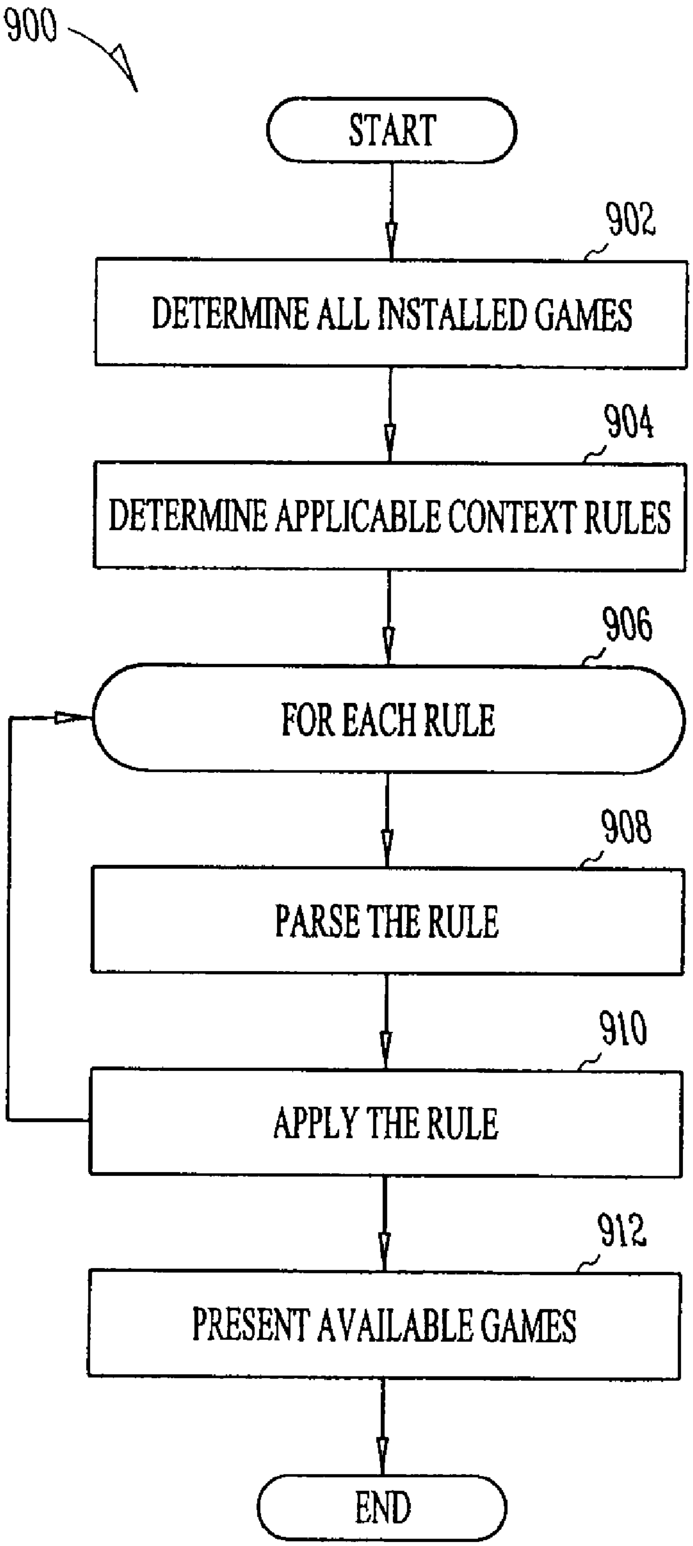
FIG. 9 is a flowchart illustrating a method of configuring a wagering game context, according to example embodiments of the invention.

FIG. 9 is a flowchart illustrating a method 900 of configuring a wagering game context. At 902, the method 900 determines which games are installed on a wagering game machine 202, 204.

At 904, the list of games is used to determine the applicable context rules. For example, a wagering game context may be described in one master configuration file containing rules for every game by a game manufacturer. In such an example, only the rules related to the games installed on the particular wagering game machine 202, 204 are relevant. In another example, the context rules for various wagering games may be stored in a centralized network database. The wagering game machine 202, 204 may then connect to the database and request context rules that are related to the wagering games on the machine.

At 906, the collection of relevant context rules is processed. For each context rule, the rule is parsed at 908 and then applied at 910. In an embodiment, the rules are organized and processed in order. For example, the rules may be ordered by a priority, a creation date, or an arbitrary ordering. In one example, rules defining availability based on dates are processed first while rules defining availability based on a player's persistent state data are processed last. In another embodiment, rules are processed in an unordered fashion, such as by first-in-first-out or first-received-first-analyzed.

In an embodiment, rules are processed using conjunctive logic. For example, if a first rule indicates that a game should be available (i.e., presented to the player) and a second rule indicates that the game should not be available, then the game will not be available. In an embodiment, rules are processed using a disjunctive logic. For example, if a first rule indicates that a game should be available, but a second rule indicates that a game should not be available, then the game will be available using the first rule and the game will be available for play.

At 912, any games that have been indicated as available are presented to the player for play. In an embodiment, games that are marked unavailable are presented to the player on a user interface in a disabled state. For example, the games that were determined to be unavailable may appear in a grayed out pictorial representation or with some other indication showing that the game is installed, but unavailable for play.

Example Wagering Game Machine

Figure 10:
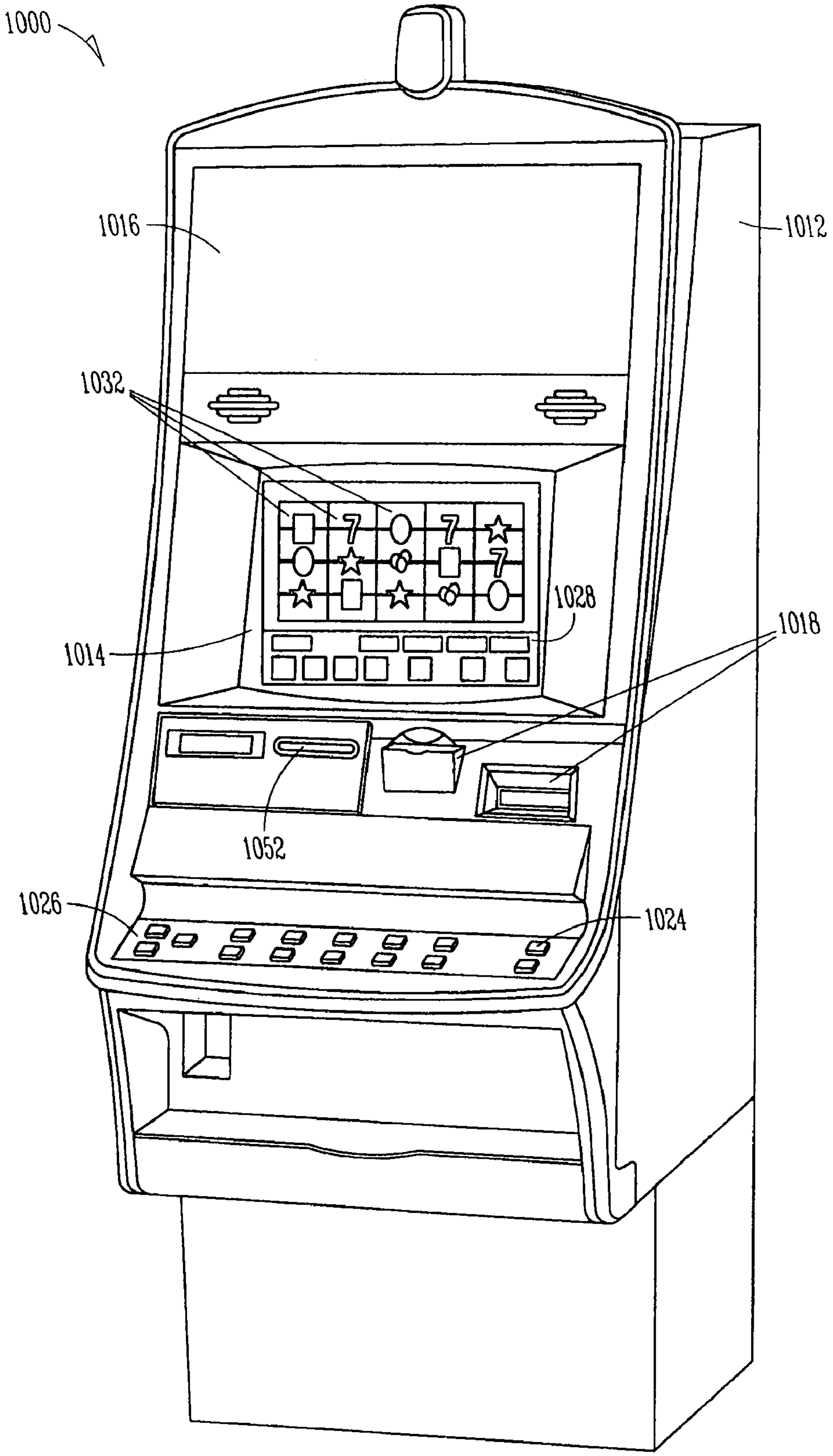
FIG. 10 is a perspective view of a wagering game machine, according to example embodiments of the invention.

FIG. 10 is a perspective view of a wagering game machine, according to example embodiments of the invention. Referring to FIG. 10, a wagering game machine 1000 is used in gaming establishments, such as casinos. According to embodiments, the wagering game machine 1000 can be any type of wagering game machine and can have varying structures and methods of operation. For example, the wagering game machine 1000 can be an electromechanical wagering game machine configured to play mechanical slots, or it can be an electronic wagering game machine configured to play video casino games, such as blackjack, slots, keno, poker, blackjack, roulette, etc.

The wagering game machine 1000 comprises a housing 1012 and includes input devices, including value input devices 1018 and a player input device 1024. For output, the wagering game machine 1000 includes a primary display 1014 for displaying information about a basic wagering game. The primary display 1014 can also display information about a bonus wagering game and a progressive wagering game. The wagering game machine 1000 also includes a secondary display 1016 for displaying wagering game events, wagering game outcomes, and/or signage information. In some embodiments, if a secondary display 1016 is not available, an indication of a player's progress through an episodic game theme can be presented on the primary display 1014. While some components of the wagering game machine 1000 are described herein, numerous other elements can exist and can be used in any number or combination to create varying forms of the wagering game machine 1000.

The value input devices 1018 can take any suitable form and can be located on the front of the housing 1012. The value input devices 1018 can receive currency and/or credits inserted by a player. The value input devices 1018 can include coin acceptors for receiving coin currency and bill acceptors for receiving paper currency. Furthermore, the value input devices 1018 can include ticket readers or barcode scanners for reading information stored on vouchers, cards, or other tangible portable storage devices. The vouchers or cards can authorize access to central accounts, which can transfer money to the wagering game machine 1000.

The player input device 1024 comprises a plurality of push buttons on a button panel 1026 for operating the wagering game machine 1000. In addition, or alternatively, the player input device 1024 can comprise a touch screen 1028 mounted over the primary display 1014 and/or secondary display 1016.

The various components of the wagering game machine 1000 can be connected directly to, or contained within, the housing 1012. Alternatively, some of the wagering game machine's components can be located outside of the housing 1012, while being communicatively coupled with the wagering game machine 1000 using any suitable wired or wireless communication technology.

The operation of the basic wagering game can be displayed to the player on the primary display 1014. The primary display 1014 can also display a bonus game associated with the basic wagering game. The primary display 1014 can include a cathode ray tube (CRT), a high resolution liquid crystal display (LCD), a plasma display, light emitting diodes (LEDs), or any other type of display suitable for use in the wagering game machine 1000. Alternatively, the primary display 1014 can include a number of mechanical reels to display the outcome. In FIG. 10, the wagering game machine 1000 is an "upright" version in which the primary display 1014 is oriented vertically relative to the player. Alternatively, the wagering game machine can be a "slant-top" version in which the primary display 1014 is slanted at about a thirty-degree angle toward the player of the wagering game machine 1000. In yet another embodiment, the wagering game machine 1000 can be a bartop model, a mobile handheld model, or a workstation console model.

A player begins playing a basic wagering game by making a wager via the value input device 1018. The player can initiate play by using the player input device's buttons or touch screen 1028. The basic game can include arranging a plurality of symbols along a payline 1032, which indicates one or more outcomes of the basic game. Such outcomes can be randomly selected in response to player input. At least one of the outcomes, which can include any variation or combination of symbols, can trigger a bonus game.

In some embodiments, the wagering game machine 1000 can also include an information reader 1052, which can include a card reader, ticket reader, bar code scanner, RFID transceiver, or computer readable storage medium interface. In some embodiments, the information reader 1052 can be used to award complimentary services, restore game assets, track player habits, etc.

In some embodiments, the wagering machine is a stand alone gaming device, a mobile gaming device, or a gaming device in a server-based gaming system.

General Comments

In the above detailed description, reference is made to specific examples by way of drawings and illustrations. These embodiments, which are also referred to herein as "examples," are described in sufficient detail to enable those skilled in the art to practice the inventive subject matter, and serve to illustrate how the inventive subject matter may be applied to various purposes or embodiments. Other embodiments are included within the inventive subject matter, as logical, mechanical, electrical, and other changes may be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. The above detailed description does not, therefore, limit embodiments of the invention, which are defined only by the appended claims.

Each of the embodiments described herein are contemplated as falling within the inventive subject matter, which is set forth in the following claims.

What is claimed is:

1. A gaming system configured to present a list of available episodic wagering games of a plurality of episodic wagering games, each episodic wagering game of the plurality comprising at least two logically linked game-play units, wherein successful completion of one of the game-play units is necessary, in accordance with game logic of the respective episodic wagering game, for a player to advance to one or more remaining game-play units of the logically linked game-play units, the gaming system comprising:

a wagering game device configured to present, via one or more display devices, a wagering game to a player;

a game context manager including one or more processors and at least one memory device, the memory device storing instructions that, when executed by the one or more processors, cause the game context manager to operate with the wagering game device and the one or more display devices to:

identify a current player advancement level based on previous game-play of the player in one or more of the game-play units of at least one episodic wagering game of the plurality;

determine a first subset of episodic wagering games of the plurality that can be played on the wagering game device;

determine one or more context rules based on a comparison of respective game-play units of the first subset of episodic wagering games and the current player advancement level of the player;

calculate, by processing the one or more context rules, a second subset of games that are available to the player, the second subset being selected from the first subset; and display the second subset of available games to the player for selection.

2. The gaming system of claim 1, wherein one of the one or more context rules requires that the game-play units are accessed in accordance with a pre-determined linear progression.

3. The gaming system of claim 2, wherein the pre-determined linear progression is ordered according to increasing difficulty of the game-play units.

4. The gaming system of claim 1, wherein each game-play unit of the episodic wagering games of the plurality has a serial number corresponding to a comparable advancement level, and wherein processing the one or more context rules includes comparing the serial numbers of the game-play units included in the first subset with the current player advancement level.

5. The gaming system of claim 4, wherein the second subset includes one or more episodic wagering games in which the game-play units have serial numbers equal to or less than the current player advancement level.

6. The gaming system of claim 4, wherein the second subset includes one or more episodic wagering games in which the game-play units have serial numbers equal to or less than the current player advancement level plus one higher level.

7. The gaming system of claim 1, wherein the current player advancement level is based on game-play units the player has attempted to complete as well as on completed game-play units.

8. The gaming system of claim 1, the instructions further causing the one or more processors to determine an additional context rule based on at least one of a designated period of game availability, a player credit balance, a game-play history, a wager amount, and a player member status.

9. The gaming system of claim 1, the instructions further causing the gaming context manager to calculate the second subset of game in accordance with a default game context in the absence of sufficient information to determine the one or more context rules.

10. A gaming system operating across a communications network and configured to present a list of available episodic wagering games of a plurality of episodic wagering games, each episodic wagering game of the plurality comprising at least two logically linked game-play units, wherein successful completion of one of the game-play units is necessary, in accordance with game logic of the respective episodic wagering game, for a player to advance to one or more remaining game-play units of the logically linked game-play units, the gaming system comprising:

a wagering game device communicably connected to the network and configured to present, via one or more display devices, a wagering game to a player;

a game context manager residing on a game server on the network, the game context manager including one or more processors and at least one memory device, the memory device storing instructions that, when executed by the one or more processors, cause the game context manager to operate with the wagering game device and the one or more display devices to:

identify a current player advancement level based on previous game-play of the player in one or more of the game-play units of at least one episodic wagering game of the plurality;

determine a first subset of episodic wagering games of the plurality that can be played on the wagering game device;

determine one or more context rules based on a comparison of the respective game-play units of the first subset of episodic wagering games and the current player advancement level of the player;

calculate, by processing the one or more context rules, a second subset of games that are available to the player, the second subset being selected from the first subset; and display the second subset of available games to the player for selection.

11. The gaming system of claim 9, wherein, in response to the player selection from the second subset, one or more games of the second subset are downloaded to the wagering game device from the game server.

12. The gaming system of claim 9, wherein the game server stores at least one of the plurality of episodic wagering games and one or more context rules corresponding to the games of the plurality of episodic wagering games.

13. A computer-implemented method of calculating a subset of a plurality of episodic wagering games available for selection by a player, each episodic wagering game of the plurality comprising at least two logically linked game-play units, wherein successful completion of one of the game-play units is necessary, in accordance with game logic of the respective episodic wagering game, for the player to advance to one or more remaining game-play units of the logically linked game-play units, the method comprising:

identifying, via a game context manager including one or more processors, a current player advancement level based on previous game-play of the player in one or more of the game-play units of at least one episodic wagering game of the plurality;

determining, via the game context manager in conjunction with a wagering game device, a first subset of episodic wagering games of the plurality that can be played on the wagering game device;

determining, via the game context manager, one or more context rules based on a comparison of respective game-play units of the first subset of episodic wagering games and the current player advancement level of the player;

calculate, via the game context manager processing the one or more context rules, a second subset of games available to the player, the second subset being selected from the first subset; and display, via the wagering game device and one or more display devices, the second subset of available games to the player for selection.

14. The method of claim 13, wherein one of the one or more context rules requires that the game-play units are accessed in accordance with a pre-determined linear progression.

15. The method of claim 14, wherein the pre-determined linear progression is ordered according to increasing difficulty of the game-play units.

16. The method of claim 13, wherein each game-play unit of the episodic wagering games of the plurality has a serial number corresponding to a comparable advancement level, and wherein processing the one or more context rules includes comparing the serial numbers of the game-play units included in the first subset with the current player advancement level.

17. The method of claim 16, wherein the second subset includes one or more episodic wagering games in which the game-play units have serial numbers equal to or less than the current player advancement level plus one higher level.

18. A computer-readable, non-transitory medium storing instructions for calculating a subset of a plurality of episodic wagering games available for selection by a player having a current advancement level of successful completion in an episodic wagering game, each episodic wagering game of the plurality comprising at least two logically linked game-play units, wherein successful completion of one of the game-play units is necessary, in accordance with game logic of the respective episodic wagering game, for a player to advance to one or more remaining game-play units of the logically linked game-play units, the stored instructions, when executed by a gaming system including a game context manager and a wagering game device, causing the gaming system to perform the method comprising:

identifying, via the game context manager including one or more processors, a current player advancement level based on previous game-play of the player in one or more of the game-play units of at least one episodic wagering game of the plurality;

determining, via the game context manager in conjunction with the wagering game device, a first subset of episodic wagering games of the plurality that can be played on the wagering game device;

determining, via the game context manager, one or more context rules based on a comparison of the respective game-play units of the first subset of episodic wagering games and the current player advancement level of the player;

calculate, via the game context manager processing the one or more context rules, a second subset of games available to the player, the second subset being selected from the first subset; and display, via the wagering game device and one or more display devices, the second subset of available games to the player for selection.

19. The medium of claim 18, wherein the medium resides on a game server connected to a communication network.

20. The medium of claim 18, wherein each game-play unit of the episodic wagering games of the plurality has a serial number corresponding to a comparable advancement level, and wherein processing the one or more context rules includes comparing the serial numbers of the game-play units included in the first subset with the current player advancement level.

21. The method of claim 18, wherein the second subset includes one or more episodic wagering games in which the game-play units have serial numbers equal to or less than the current player advancement level plus one higher level.

* * * * *